(12) United States Patent
Ji et al.

(10) Patent No.: US 12,250,580 B2
(45) Date of Patent: Mar. 11, 2025

(54) METHOD FOR RADIO LINK MONITORING, TERMINAL, BASE STATION, AND STORAGE MEDIUM

(71) Applicant: VIVO MOBILE COMMUNICATION CO.,LTD., Guangdong (CN)

(72) Inventors: Zichao Ji, Chang'an Dongguan (CN); Xueming Pan, Chang'an Dongguan (CN); Huaming Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 604 days.

(21) Appl. No.: 17/490,901

(22) Filed: Sep. 30, 2021

(65) Prior Publication Data
US 2022/0022085 A1   Jan. 20, 2022

Related U.S. Application Data

(63) Continuation of application No. PCT/CN2020/081904, filed on Mar. 28, 2020.

(30) Foreign Application Priority Data

Apr. 2, 2019 (CN) .......................... 201910263195.1

(51) Int. Cl.
*H04W 24/10* (2009.01)
*H04L 1/1812* (2023.01)
(Continued)

(52) U.S. Cl.
CPC ........... *H04W 24/10* (2013.01); *H04L 1/1819* (2013.01); *H04L 5/0053* (2013.01); *H04W 76/19* (2018.02); *H04W 76/28* (2018.02); *H04W 92/18* (2013.01)

(58) Field of Classification Search
CPC ..... H04W 24/10; H04W 76/19; H04W 76/28; H04W 92/18; H04L 1/1819; H04L 5/0053
See application file for complete search history.

(56) References Cited

U.S. PATENT DOCUMENTS

| 2010/0113008 A1* | 5/2010 | Wang ........................ H04L 1/20 455/67.11 |
| 2010/0330920 A1* | 12/2010 | Koskela ................ H04L 1/1825 455/67.11 |

(Continued)

FOREIGN PATENT DOCUMENTS

| CN | 108702244 A | 10/2018 |
| EP | 3 242 515 A1 | 11/2017 |

(Continued)

OTHER PUBLICATIONS

Interdigital Inc., Support for Unicast and Groupcast in NR V2X, R2-1816787, 3GPP RAN WG2 Meeting #104, Spokane, USA, Nov. 12-16, 2018.

(Continued)

*Primary Examiner* — Jael M Ulysse
(74) *Attorney, Agent, or Firm* — BROOKS KUSHMAN P.C.

(57) ABSTRACT

A method for radio link monitoring, a terminal, a base station, and a storage medium are provided. The method for radio link monitoring includes: in sidelink communication, performing a radio link monitoring (RLM) measurement on a radio link between terminals to monitor radio link quality between the terminals. With the embodiments of this application, the radio link quality in the sidelink communication can be monitored.

20 Claims, 2 Drawing Sheets

---

In sidelink communication, perform an RLM measurement on a radio link between terminals, to monitor radio link quality between the terminals (51) Int. Cl.
*H04L 5/00* (2006.01)
*H04W 76/19* (2018.01)
*H04W 76/28* (2018.01)
*H04W 92/18* (2009.01)

(56) References Cited

U.S. PATENT DOCUMENTS

| | | | |
|---|---|---|---|
| 2013/0003700 A1 | 1/2013 | Zhang et al. | |
| 2013/0153298 A1 | 6/2013 | Pietraski et al. | |
| 2017/0353932 A1* | 12/2017 | Sorrentino | H04W 52/383 |
| 2018/0070371 A1 | 3/2018 | Shin et al. | |
| 2018/0092093 A1* | 3/2018 | Ramaswamy | H04B 1/58 |
| 2020/0252989 A1* | 8/2020 | Chen | H04W 76/19 |
| 2021/0105066 A1 | 4/2021 | Uchiyama et al. | |
| 2021/0345354 A1* | 11/2021 | Kusashima | H04L 27/0006 |
| 2022/0150730 A1* | 5/2022 | Freda | H04W 24/04 |
| 2022/0191962 A1* | 6/2022 | Di Girolamo | H04L 5/0053 |

FOREIGN PATENT DOCUMENTS

| | | |
|---|---|---|
| WO | 2011131044 A1 | 10/2011 |
| WO | 2016105570 A1 | 6/2016 |
| WO | 2016186345 A1 | 11/2016 |
| WO | 2018/113947 A1 | 6/2018 |
| WO | WO-2018113946 A1 * | 6/2018 ............ H04B 17/24 |
| WO | 2018203443 A1 | 11/2018 |
| WO | 2018232259 A1 | 12/2018 |

OTHER PUBLICATIONS

International Search Report and Written Opinion issued in corresponding application No. PCT/CN2020/081904, dated Jul. 1, 2020.
EP Search Report in Application No. 20781905.3 Dated Apr. 20, 2022.
IN Office Action in Application No. 202127049836 Dated Mar. 28, 2022.
"Discussion on transmitter UE side RLM and RLF in NR SL" 3GPP TSG-RAN WG2 Meeting #105bis, LG Electronics, R2-1904223, Apr. 8, 2019.
"3rd Generation Partnership Project; Technical Specification Group Radio Access Network; Evolved Universal Terrestrial Radio Access (E-UTRA); Radio Resource Control (RRC); Protocol specification (Release 15)" 3GPP TS 36.331 V15.5.0, Mar. 2019.
First Office Action for Korean Application No. 10-2021-7035576, dated Feb. 8, 2024, 7 Pages.
Samsung "Consideration on sidelink RLM" 3GPP TSG RAN WG1 #96, Athens, Greece, Feb. 2019, R1-1902281, 2 Pages.

* cited by examiner

In sidelink communication, perform an RLM measurement on a radio link between terminals, to monitor radio link quality between the terminals

FIG. 1

In sidelink communication, perform a link monitoring configuration for a terminal, so that the terminal implements an RLM measurement based on the link monitoring configuration, where the RLM measurement is an RLM measurement performed by a first terminal on a radio link between terminals, to monitor radio link quality between the terminals

METHOD FOR RADIO LINK MONITORING, TERMINAL, BASE STATION, AND STORAGE MEDIUM

CROSS-REFERENCE TO RELATED APPLICATIONS

This application is continuation application of PCT International Application No. PCT/CN2020/081904 filed on Mar. 28, 2020, which claims priority to Chinese Patent Application No. 201910263195.1, filed on Apr. 2, 2019 and entitled "METHOD FOR RADIO LINK MONITORING, TERMINAL, BASE STATION, AND STORAGE MEDIUM", the disclosures of which are incorporated herein by reference in their entireties.

TECHNICAL FIELD

This application relates to the field of communications, and in particular, to a method for radio link monitoring, a terminal, a base station, and a storage medium.

BACKGROUND

A long term evolution (LTE) system supports sidelink transmission, in which data transmission between different terminals (UE) is performed not through a network device, but directly on the physical layer. In LTE sidelink, communication is performed based on broadcast, and such design is suitable for emergency communication in particular public safety incidents (for example, at sites of fires, earthquakes, or other disasters), vehicle to everything (V2X) communication, and the like. V2X communication includes various services, such as basic security communication, advanced driving (self-driving) communication, platooning communication, and sensor extended communication.

In LTE sidelink, UE transmits sidelink control information (SCI) over a physical sidelink control channel (PSCCH), and schedules transmission of a physical sidelink shared channel (PSSCH) to transmit data, where the transmission is in the form of broadcast, and a receive end does not reply to a transmit end whether data has been received.

Because in LTE sidelink communication, the receive end does not reply to the transmit end whether the data has been received; although LTE sidelink can be used for V2X basic security communication, it is not suitable for other more advanced V2X services. Obviously, the current LTE sidelink technology can no longer satisfy a growing demand for practical applications.

SUMMARY

Embodiments of this application provide a method for radio link monitoring, a terminal, a base station, and a readable storage medium.

According to a first aspect, an embodiment of this application provides a method for radio link monitoring, applied to a first terminal, where the method includes: in sidelink communication, performing a radio link monitoring (RLM) measurement on a radio link between terminals to monitor radio link quality between the terminals.

According to a second aspect, an embodiment of this application further provides a radio link monitoring apparatus, applied to a first terminal, where the apparatus includes: a link measurement module, configured to, in sidelink communication, perform an RLM measurement on a radio link between terminals to monitor radio link quality between the terminals.

According to a third aspect, an embodiment of this application further provides a method for radio link monitoring, applied to a second terminal, where the method includes: in sidelink communication, transmitting data in unicast, multicast, and/or broadcast mode, so that a first terminal performs an RLM measurement on a radio link between terminals to monitor radio link quality between the terminals. Transmitted data includes an RS transmitted on a predetermined time-frequency resource. The predetermined time-frequency resource is a semi-persistent resource or periodic resource that is reserved for a terminal, or the predetermined time-frequency resource is an aperiodic resource or semi-persistent resource that is reserved for a terminal, or the predetermined time-frequency resource is a resource associated with a sidelink synchronization block, or the predetermined time-frequency resource is a resource associated or multiplexed with a specified channel.

According to a fourth aspect, an embodiment of this application further provides a radio link monitoring apparatus, applied to a second terminal, where the apparatus includes: a data transmitting module, configured to, in sidelink sidelink communication, transmit data in unicast, multicast, or broadcast mode, so that a first terminal performs an RLM measurement on a radio link between terminals to monitor radio link quality between the terminals. The data transmitted by the data transmitting module includes an RS transmitted on a predetermined time-frequency resource. The predetermined time-frequency resource is a semi-persistent resource or periodic resource that is reserved for a terminal, or the predetermined time-frequency resource is an aperiodic resource or semi-persistent resource that is reserved for a terminal, or the predetermined time-frequency resource is a resource associated with a sidelink synchronization block, or the predetermined time-frequency resource is a resource associated or multiplexed with a specified channel.

According to a fifth aspect, an embodiment of this application further provides a terminal, where the terminal includes a processor, a memory, and a computer program stored in the memory and capable of running on the processor, and when the computer program is executed by the processor, the steps of any one of the foregoing methods for radio link monitoring are implemented.

According to a sixth aspect, an embodiment of this application further provides a method for radio link monitoring, applied to a base station, where the method includes: in sidelink communication, performing a link monitoring configuration for a terminal, so that the terminal implements, based on the link monitoring configuration, at least one of the following: enabling an RLM measurement, disabling an RLM measurement, performing an RLM measurement by using an RLM measurement method, performing an RLM measurement by using a combination of various RLM measurement methods, configuring a threshold for RLM measurement, configuring a preset count corresponding to a threshold for RLM measurement, configuring an RS sequence for RLM measurement, configuring a time-frequency resource for RLM measurement, and configuring an RLM measurement period, where the RLM measurement is an RLM measurement performed by a first terminal on a radio link between terminals to monitor radio link quality between the terminals.

According to a seventh aspect, an embodiment of this application further provides a radio link monitoring apparatus, applied to a base station, where the apparatus includes: a receiving module, configured to receive an RLM measurement result reported by a terminal, where the RLM measurement is, in sidelink communication, an RLM measurement performed by a first terminal on a radio link between terminals to monitor radio link quality between the terminals.

According to an eighth aspect, an embodiment of this application further provides a base station, where the base station includes a processor, a memory, and a computer program stored in the memory and capable of running on the processor, and when the computer program is executed by the processor, the steps of any one of the methods for radio link monitoring are implemented.

According to a ninth aspect, an embodiment of this application further provides a computer-readable storage medium, where the computer-readable storage medium stores a computer program, and when the computer program is executed by a processor, the steps of any one of the foregoing methods for radio link monitoring are implemented.

BRIEF DESCRIPTION OF DRAWINGS

From the following description of the specific embodiments of this application with reference to the accompanying drawings, it can be better understood that same or similar reference numerals in this application indicate same or similar features.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

Figure 1:
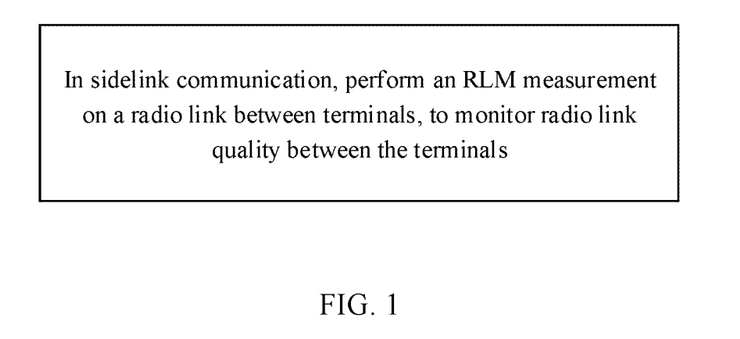
FIG. 1 is a flowchart of a method for radio link monitoring according to an embodiment of this application.

As shown in FIG. 1, an embodiment of this application provides a method for radio link monitoring, applied to a first terminal, where the method includes:

in sidelink communication, performing a radio link monitoring (RLM) measurement on a radio link between terminals to monitor a quality of the radio link between the terminals, where In this embodiment of this application, in sidelink communication, a radio link monitoring (RLM) measurement is performed on a radio link between the terminals to monitor radio link quality and discover a radio link failure (RLF) in a timely manner.

In an implementation of this application, the RLM measurement is performed on a basis of a physical sidelink control channel PSCCH reference signal RS of a second terminal.

In an implementation of this application, the RLM measurement is performed based on the number of pieces of valid SCI or the number of PSCCHs transmitted by a second terminal per unit time.

In an implementation of this application, the method further includes: reporting a first reporting indication if a count that the number of pieces of valid SCI or the number of PSCCHs is greater than a first threshold reaches a first preset count; or reporting a second reporting indication if a count that the number of pieces of valid SCI or the number of PSCCHs is less than a second threshold reaches a second preset count.

In an implementation of this application, the performing a radio link monitoring (RLM) measurement on a radio link between terminals includes: receiving at least one PSCCH or at least one piece of sidelink control information SCI; and performing the RLM measurement based on the at least one PSCCH or the at least one piece of sidelink control information SCI.

The at least one PSCCH or the at least one piece of SCI corresponds to unicast data transmitted from a second terminal to a first terminal; or the at least one PSCCH or the at least one piece of SCI corresponds to unicast data transmitted from a second terminal to another terminal, or the at least one PSCCH or the at least one piece of SCI corresponds to broadcast or multicast data transmitted by a second terminal.

In an implementation of this application, the RLM measurement is performed on a basis of a physical sidelink shared channel PSSCH reference signal RS of a second terminal.

In an implementation of this application, the performing a radio link monitoring (RLM) measurement on a radio link between terminals includes: receiving at least one PSCCH or the at least one piece of SCI; performing a measurement on an RS based on a demodulation reference signal DMRS if the at least one PSCCH or the at least one piece of SCI corresponds to unicast data transmitted from a second terminal to a first terminal; or performing a measurement on an RS based on a DMRS if the at least one PSCCH or the at least one piece of SCI corresponds to broadcast or multicast data transmitted by a second terminal; or performing a measurement on an RS if the at least one PSCCH or the at least one piece of SCI corresponds to data transmitted from a second terminal to another terminal, where the RS is an RS that is not precoded, or the RS is precoded differently from the PSSCH of the second terminal.

In an implementation of this application, the RLM measurement is performed on a basis of a transmit sequence of a physical sidelink feedback channel PSFCH of a second terminal, or on a basis of a PSFCH DMRS of a second terminal.

In an implementation of this application, the RLM measurement is performed on a basis of an RS of a second terminal.

In an implementation of this application, the RLM measurement is performed on a basis of a time-division-multiplexed periodic RS of a second terminal.

In an implementation of this application, the second terminal transmits an RS on a predetermined time-frequency resource, where the predetermined time-frequency resource is a semi-persistent resource or periodic resource that is reserved for a terminal, or the predetermined time-frequency resource is a resource associated with a sidelink synchronization block, or the predetermined time-frequency resource is a resource associated or multiplexed with a specified channel.

In an implementation of this application, the RLM measurement is performed on a basis of an aperiodic RS of a second terminal.

In an implementation of this application, the second terminal transmits an RS on a predetermined time-frequency resource, where the predetermined time-frequency resource is an aperiodic resource or semi-persistent resource that is reserved for a terminal, or the predetermined time-frequency resource is a resource associated with a sidelink synchronization block, or the predetermined time-frequency resource is a resource associated or multiplexed with a specified channel.

In an implementation of this application, the sequence of the RS of the second terminal is generated based on identification information of the second terminal.

In an implementation of this application, resources reserved for terminals are time domain resources different from one another, or time domain resources of the terminals are time division multiplexed.

In an implementation of this application, the method further includes: reporting a first reporting indication if a count that an RLM measurement result is greater than a third threshold reaches a third preset count; or reporting a second reporting indication if a count that an RLM measurement result is less than a fourth threshold reaches a fourth preset count.

In an implementation of this application, the RLM measurement is performed based on the number of HARQ feedbacks transmitted by a second terminal.

In an implementation of this application, the method further includes: reporting a first reporting indication if a count that the number of HARQ ACKs is greater than a fifth threshold reaches a fifth preset count; or reporting a second reporting indication if a count that the number of HARQ NACKs or DTX cycles is less than a sixth threshold reaches a sixth preset count.

In an implementation of this application, the RLM measurement is performed based on a reference signal received power RSRP or path loss pathloss between a first terminal and a second terminal.

In an implementation of this application, the method further includes: performing, by a first terminal, a measurement on an RS of a second terminal and obtaining an RSRP; or receiving, by a first terminal, an RSRP transmitted by a second terminal and calculating a pathloss between the first terminal and the second terminal based on the RSRP.

In an implementation of this application, the method further includes: reporting a first reporting indication if a count that the RSRP is greater than a seventh threshold reaches a seventh preset count; or reporting a second reporting indication if a count that the RSRP is less than an eighth threshold reaches an eighth preset count; or reporting a first reporting indication if a count that the pathloss is less than a ninth threshold reaches a ninth preset count; or reporting a second reporting indication if a count that the pathloss is greater than a tenth threshold reaches a tenth preset count.

In an implementation of this application, the method further includes: reporting an RLM measurement result to an upper layer, where the RLM measurement result includes: a first reporting indication for indicating a good radio link quality; and/or a second reporting indication for indicating a poor radio link quality.

In an implementation of this application, the method further includes: reporting a link failure message directly to an upper layer or triggering a link failure if link quality becomes poor; or reporting a link recovery message directly to an upper layer or triggering a link recovery if link quality becomes better.

Corresponding to the foregoing solution, an embodiment of this application further provides a radio link monitoring apparatus, applied to a first terminal, where the apparatus includes: a link measurement module, configured to, in sidelink communication, perform an RLM measurement on a radio link between terminals to monitor radio link quality between the terminals.

An embodiment of this application further provides a method for radio link monitoring, applied to a second terminal, where the method includes: in sidelink sidelink communication, transmitting data in unicast, multicast, and/or broadcast mode, so that a first terminal performs an RLM measurement on a radio link between terminals to monitor radio link quality between the terminals, where the data transmitted includes an RS transmitted on a predetermined time-frequency resource; and the predetermined time-frequency resource is a semi-persistent resource or periodic resource that is reserved for a terminal, or the predetermined time-frequency resource is an aperiodic resource or semi-persistent resource that is reserved for a terminal, or the predetermined time-frequency resource is a resource associated with a sidelink synchronization block, or the predetermined time-frequency resource is a resource associated or multiplexed with a specified channel.

In an implementation of this application, a sequence of the RS that is transmitted on the predetermined time-frequency resource is generated based on identification information of the second terminal.

Corresponding to the foregoing solution, an embodiment of this application further provides a radio link monitoring apparatus, applied to a second terminal, where the apparatus includes: a data transmitting module, configured to, in sidelink sidelink communication, transmit data in unicast, multicast, or broadcast mode, so that a first terminal performs an RLM measurement on a radio link between terminals to monitor radio link quality between the terminals, where the data transmitted by the data transmitting module includes an RS transmitted on a predetermined time-frequency resource; and the predetermined time-frequency resource is a semi-persistent resource or periodic resource that is reserved for a terminal, or the predetermined time-frequency resource is an aperiodic resource or semi-persistent resource that is reserved for a terminal, or the predetermined time-frequency resource is a resource associated with a sidelink synchronization block, or the predetermined time-frequency resource is a resource associated or multiplexed with a specified channel.

Corresponding to the foregoing solution, an embodiment of this application further provides a terminal, where the terminal includes a processor, a memory, and a computer program stored in the memory and capable of running on the processor, and when the computer program is executed by the processor, the steps of the method for radio link monitoring are implemented.

Figure 2:
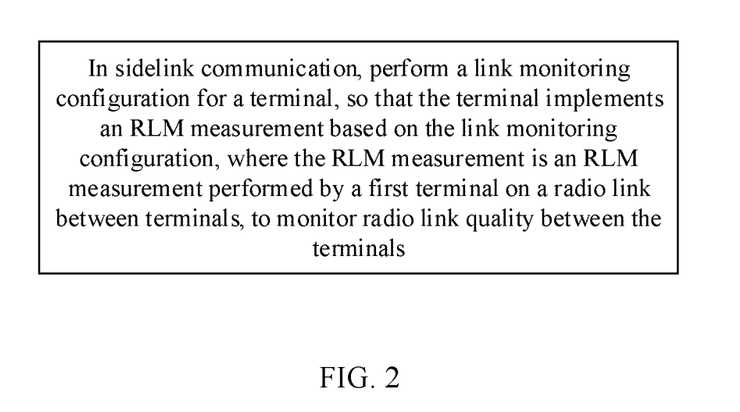
FIG. 2 is a flowchart of a method for radio link monitoring according to an embodiment of this application.

As shown in FIG. 2, an embodiment of this application further provides a method for radio link monitoring, applied to a base station, where the method includes: in sidelink communication, performing a link monitoring configuration for a terminal, so that the terminal implements, based on the link monitoring configuration, at least one of the following:

enabling an RLM measurement;
disabling an RLM measurement;
performing an RLM measurement by using an RLM measurement method;
performing an RLM measurement by using a combination of various RLM measurement methods;
configuring a threshold for RLM measurement;
configuring a preset count corresponding to a threshold for RLM measurement;
configuring a RS sequence for RLM measurement;

configuring a time-frequency resource for RLM measurement; and configuring an RLM measurement period; wherein the RLM measurement is an RLM measurement performed by a first terminal on a radio link between terminals to monitor radio link quality between the terminals.

In an implementation of this application, the method further includes: receiving an RLM measurement result reported by a terminal.

In an implementation of this application, the RLM measurement result includes: a first reporting indication for indicating a good radio link quality; and/or a second reporting indication for indicating a poor radio link quality.

In an implementation of this application, the method further includes: receiving a link failure message and/or link recovery message reported by a terminal.

Corresponding to the foregoing solution, an embodiment of this application further provides a radio link monitoring apparatus, applied to a base station, where the apparatus includes: a receiving module, configured to receive an RLM measurement result reported by a terminal, where the RLM measurement is, in sidelink communication, an RLM measurement performed by a first terminal on a radio link between terminals to monitor radio link quality between the terminals.

Corresponding to the foregoing solution, an embodiment of this application further provides a base station, where the base station includes a processor, a memory, and a computer program stored in the memory and capable of running on the processor, and when the computer program is executed by the processor, the steps of the method for radio link monitoring are implemented.

An embodiment of this application further provides a method for radio link monitoring, applied to a terminal, where the method includes: in sidelink sidelink communication, performing a radio link monitoring (RLM) measurement on a radio link between terminals to monitor radio link quality between the terminals, where if the terminal is configured with a plurality of resource pools, the RLM measurement is performed in each resource pool, or if the terminal is configured with a plurality of beams or a plurality of antenna panels, the RLM measurement is performed on each beam or each antenna panel.

In an implementation of this application, the terminal is configured with a plurality of resource pools, and link quality is determined to be poor if at least one of the following criteria is met:

link quality of a plurality of resource pools is poor;

link quality of a specified resource pool is poor; and link quality of any one of the resource pools is poor.

In an implementation of this application, the terminal is configured with a plurality of resource pools, and link quality is determined recovered if at least one of the following criteria is met:

link quality of any one of the resource pools has become better;

link quality of a specified resource pool has become better; and link quality of a plurality of resource pools has become better.

In an implementation of this application, the specified resource pool includes at least one of the following:

a resource pool for transmission of specified traffic;

a resource pool for transmission to a specified destination address;

a resource pool on a specified carrier or a specified frequency;

a resource pool for a specified transmission type;

a resource pool associated with a specified feature; and a resource pool for transmission of a specified special channel.

In an implementation of this application, the terminal is configured with a plurality of beams or a plurality of antenna panels, and link quality is determined to be poor if at least one of the following criteria is met:

link quality of a plurality of beams or the plurality of antenna panels is poor;

link quality of a specified beam or a specified antenna panel is poor; and link quality of any one of the beams or any one of the antenna panels is poor.

In an implementation of this application, the terminal is configured with a plurality of beams or a plurality of antenna panels, and link quality is determined recovered if at least one of the following criteria is met:

link quality of any one of the beams or any one of the antenna panels has become better;

link quality of a specified beam or a specified antenna panel has become better; and link quality of a plurality of beams or the plurality of antenna panels has become better.

Corresponding to the foregoing solution, an embodiment of this application further provides a radio link monitoring apparatus, applied to a terminal, where the apparatus includes: a link measurement module, configured to, in sidelink communication, perform an RLM measurement on a radio link between terminals to monitor radio link quality between the terminals, where if the terminal is configured with a plurality of resource pools, the link measurement module performs RLM measurement in each resource pool, or if the terminal is configured with a plurality of beams or a plurality of antenna panels, the link measurement module performs RLM measurement on each beam or each antenna panel.

Corresponding to the foregoing solution, an embodiment of this application provides a terminal, where the terminal includes a processor, a memory, and a computer program stored in the memory and capable of running on the processor, and when the computer program is executed by the processor, the steps of the method for radio link monitoring are implemented.

An embodiment of this application provides a method for radio link monitoring, applied to a base station, where the method includes: in sidelink communication, configuring for a terminal a mapping between RLM measurements and radio link quality, where the RLM measurement is an RLM measurement performed by a first terminal on a radio link between terminals to monitor radio link quality between the terminals.

In an implementation of this application, the method further includes: receiving an RLM measurement result reported by a terminal.

In an implementation of this application, a terminal is configured with a plurality of resource pools, the RLM measurement is an RLM measurement for a plurality of resource pools, and the mapping between RLM measurements and radio link quality includes at least one of the following items:

the radio link quality between the terminals is determined to be poor if the RLM measurement for a plurality of resource pools shows that link quality is poor;

the radio link quality between the terminals is determined to be poor if the RLM measurement for a specified resource pool shows that link quality is poor; and the radio link quality between the terminals is determined to be poor if the RLM measurement for any one of the resource pools shows that link quality is poor.

In an implementation of this application, a terminal is configured with a plurality of resource pools, the RLM measurement is an RLM measurement for a plurality of resource pools, and the mapping between RLM measurements and radio link quality includes at least one of the following items:

the radio link quality between the terminals is determined recovered if the RLM measurement for any one of the resource pools shows that link quality has become better;

the radio link quality between the terminals is determined recovered if the RLM measurement for a specified resource pool shows that link quality has become better; and the radio link quality between the terminals is determined recovered if the RLM measurement for a plurality of resource pools shows that link quality has become better.

In an implementation of this application, the method further includes: configuring the specified resource pool for the terminal, where the specified resource pool includes at least one of the following:

a resource pool for transmission of specified traffic;
a resource pool for transmission to a specified destination address;
a resource pool on a specified carrier or a specified frequency;
a resource pool for a specified transmission type;
a resource pool associated with a specified feature; and
a resource pool for transmission of a specified special channel.

In an implementation of this application, a terminal is configured with a plurality of beams or a plurality of antenna panels, and the RLM measurement is an RLM measurement for the plurality of beams or the plurality of antenna panels. The mapping between RLM measurements and radio link quality includes at least one of the following items:

the radio link quality between the terminals is determined to be poor if the RLM measurement for a plurality of beams or the plurality of antenna panels shows that link quality is poor;

the radio link quality between the terminals is determined to be poor if the RLM measurement for a specified beam or a specified antenna panel shows that link quality is poor; and the radio link quality between the terminals is determined to be poor if the RLM measurement for any one of the beams or any one of the antenna panels shows that link quality is poor.

In an implementation of this application, a terminal is configured with a plurality of beams or a plurality of antenna panels, and the RLM measurement is an RLM measurement for the plurality of beams or the plurality of antenna panels. The mapping between RLM measurements and radio link quality includes at least one of the following items:

the radio link quality between the terminals is determined recovered if the RLM measurement for any one of the beams or any one of the antenna panels shows that link quality has become better;

the radio link quality between the terminals is determined recovered if the RLM measurement for a specified beam or a specified antenna panel shows that link quality has become better; and the radio link quality between the terminals is determined recovered if the RLM measurement for a plurality of beams or the plurality of antenna panels shows that link quality has become better.

Corresponding to the foregoing solution, an embodiment of this application provides a radio link monitoring apparatus, applied to a base station, where the apparatus includes a configuration module, configured to, in sidelink communication, configure for a terminal a mapping between RLM measurements and radio link quality, and the RLM measurement is an RLM measurement performed by a first terminal on a radio link between terminals to monitor radio link quality between the terminals.

Corresponding to the foregoing solution, an embodiment of this application provides a base station, where the base station includes a processor, a memory, and a computer program stored in the memory and capable of running on the processor, and when the computer program is executed by the processor, the steps of the method for radio link monitoring are implemented.

In this embodiment of this application, the first terminal is a receive end, the second terminal is a transmit end. The following describes in detail the specific implementations of this application by using a plurality of embodiments.

Embodiment 1

The RLM measurement is performed on a basis of a PSCCH reference signal (RS) of the transmit end.

Specifically, first, the receive end UE1 receives a PSCCH, detects and demodulates sidelink control information (SCI), and searches for (or confirms) a PSCCH of a specified transmit end UE2 based on a transmit end identifier (source ID) in the SCI.

The source ID may be explicitly encoded in the SCI as a field of the SCI; or implicitly carried in the SCI, for example, scrambled on the SCI, PSCCH, or RS as a scrambling sequence.

What is scheduled (or associated or allocated) by the SCI may be data unicast or multicast to the receive end UE, or may be data unicast or multicast to other UEs, or data broadcast to any UE.

Then, the receive end UE1 performs a measurement on a PSCCH RS of the transmit end UE2.

The RS may be an RS for channel estimation, channel measurement, or decoding.

In addition, the receive end UE1 reports the measurement result to an upper layer.

If the measurement result is better than a specific threshold A (for example, reaching a configured number counter A for once, or for a plurality of times totally, or for a plurality of times continuously), the link quality is considered good, and a first indication, for example, $Q_{in}$, may be reported to the upper layer.

If the measurement result is worse than a specific threshold B (reaching a configured number counter B for once, or for a plurality of times totally, or for a plurality of times continuously), the link quality is considered relatively poor, and a first indication, for example, $Q_{out}$, may be reported to the upper layer.

The threshold A and the threshold B may be the same or different, and if they are different, typically, A should be greater than B to avoid a ping-pong effect.

In addition, when the link quality turns worse or better, the receive end UE1 may directly report or trigger a link failure (RLF), or trigger a link recovery (recovery).

Embodiment 2

The RLM measurement is performed on a basis of a physical sidelink shared channel PSSCH RS of a second terminal.

Specifically, first, the receive end UE1 receives a PSCCH, detects and demodulates SCI, and searches for/confirms, based on a transmit end identifier (source ID) in the SCI, a PSCCH transmitted by a specified transmit end UE2.

Then, the receive end UE1 performs a measurement on a PSSCH RS of the transmit end UE2.

The RS may be an RS for channel estimation (channel estimation), channel measurement (channel measurement), or decoding (decoding).

If unicast data is provided to the receive end UE1, the measurement can be performed based on a demodulation RS (DMRS).

If broadcast data or multicast data is provided, the measurement can be performed based on a measurement on a demodulation RS (DMRS).

If data is provided to other receive UEs, the RS is an RS that is not precoded, which may be considered that the RS is not precoded in the same way as the PSSCH.

In addition, the UE1 reports the measurement result to an upper layer.

If the measurement result is better than a specific threshold C (reaching a configured number counter C for once, or for a plurality of times totally, or for a plurality of times continuously), the link quality is considered good, and for example, Qin is reported.

If the measurement result is worse than a specific threshold D (reaching a configured number counter D for once, or for a plurality of times totally, or for a plurality of times continuously), the link quality is considered relatively poor, and for example, Qout is reported.

The threshold C and the threshold D may be the same or different, and if they are different, typically, C is greater than D to avoid a ping-pong effect.

In addition, when the link quality turns worse or better, the UE1 directly reports or triggers a link failure (RLF) or recovery (recovery).

Embodiment 3

The RLM measurement is performed on a basis of a transmit sequence of a physical sidelink feedback channel PSFCH of a second terminal, or on a basis of a PSFCH DMRS of a second terminal.

Specifically, first, the transmit end UE2 transmits a PSCCH and a PSSCH to the receive end UE1.

Then, the receive end UE1 transmits a HARQ feedback for the received PSCCH/PSSCH through a PSFCH.

Next, the transmit end UE2 performs an RLM measurement on a transmit sequence or DMRS of the PSFCH.

In addition, the UE reports the measurement result to an upper layer.

If the measurement result is better than a specific threshold E (reaching a configured number counter E for once, or for a plurality of times totally, or for a plurality of times continuously), the link quality is considered good (for example, Qin is reported).

If the measurement result is worse than a specific threshold F (reaching a configured number counter F for once, or for a plurality of times totally, or for a plurality of times continuously), the link quality is considered relatively poor (for example, Qout is reported).

The threshold E and the threshold F may be the same or different, and if they are different, typically, E is greater than F to avoid a ping-pong effect.

In addition, when the link quality turns worse or better, the UE directly reports or triggers a link failure (RLF) or recovery (recovery).

Embodiment 4

The RLM measurement is performed on a basis of an RS of a second terminal.

Specifically, first, the transmit end UE2 transmits an RS on a specified time-frequency resource, where the resource may be a semi-persistent or periodic resource that is reserved for the UE;

the resource may be an aperiodic resource or semi-persistent resource that is reserved for the UE;

the resource may be a resource associated with a sidelink synchronization block;

the resource may be a resource associated or multiplexed with a specified channel, where the specified channel may be a PSCCH, PSSCH, or PSFCH; and a sequence of the RS may be generated based on identification information (for example, UE ID).

The resources that are reserved for the transmit end UE and the receive end UE are time domain resources different from one another, that is, are time division multiplexed between the UEs. For example, on a same RS resource, at a time position t (or period n), UE1 transmits an RS, and UE2 performs a measurement, while at a time position t+k (or period n+k), UE2 transmits an RS, and UE1 performs a measurement.

The UEs may negotiate resources by using signaling (for example, RRC), or automatically select resources (for example, implicitly select resources based on a UE ID).

Then, the receive end UE1 performs a measurement on a PSSCH RS of the transmit end UE2, and reports a measurement result to an upper layer.

If the measurement result is better than a specific threshold G (reaching a configured number counter G for once, or for a plurality of times totally, or for a plurality of times continuously), the link quality is considered good (for example, Qin is reported).

If the measurement result is worse than a specific threshold H (reaching a configured number counter H for once, or for a plurality of times totally, or for a plurality of times continuously), the link quality is considered relatively poor (for example, Qout is reported).

The threshold G and the threshold H may be the same or different, and if they are different, typically, G is greater than H to avoid a ping-pong effect.

In addition, when the link quality turns worse or better, the UE directly reports or triggers a link failure (RLF) or recovery (recovery).

Embodiment 5

The RLM measurement is performed based on the number of pieces of valid SCI or the number of PSCCHs of a second terminal per unit time.

Specifically, first, the receive end UE1 receives a PSCCH, detects and demodulates SCI, and searches for/confirms, based on a transmit end identifier (source ID) in the SCI, a PSCCH and/or PSCCH transmitted by a specified transmit end UE2.

What is scheduled (or allocated or associated) by the PSCCH or SCI may be data unicast or multicast to the receive end UE1, or may be data unicast or multicast to other UEs, or data broadcast to any UE.

Then, the receive end UE1 calculates the number of pieces of valid SCI (or PSCCHs) detected by the transmit end UE per unit time (period), and reports a measurement result to an upper layer.

If the number of pieces of valid SCI is greater than a specific threshold I (reaching a configured number counter I for once, or for a plurality of times totally, or for a plurality of times continuously), the link quality is considered good.

If the number of pieces of valid SCI is greater than a specific threshold J (reaching a configured number counter J for once, or for a plurality of times totally, or for a plurality of times continuously), the link quality is considered relatively poor.

The threshold I and the threshold J may be the same or different, and if they are different, typically, I is greater than J to avoid a ping-pong effect.

In addition, when the link quality turns worse or better, the UE directly reports or triggers a link failure (RLF) or recovery (recovery).

Embodiment 6

The RLM measurement is performed based on the number of HARQ feedbacks transmitted by a second terminal.

Specifically, first, the transmit end UE transmits a PSCCH and a PSSCH to the receive end UE.

Then, the receive end UE transmits a HARQ feedback for the received PSCCH/PSSCH.

Next, the transmit end UE calculates the number of detected HARQ feedbacks from the receive end UE per unit time, and reports a measurement result to an upper layer.

If the number of HARQ ACKs is greater than a specific threshold K (reaching a configured number counter K for once, or for a plurality of times totally, or for a plurality of times continuously), the link quality is considered good.

If the number of HARQ NACKs or DTXs (that is, neither HARQ ACK nor HARQ NACK is received) is greater than a specific threshold L (reaching a configured number counter L for once, or for a plurality of times totally, or for a plurality of times continuously), the link quality is considered relatively poor.

The threshold K and the threshold L may be the same or different, and if they are different, typically, K is greater than L to avoid a ping-pong effect.

In addition, when the link quality turns worse or better, the UE directly reports or triggers a link failure (RLF) or recovery (recovery).

Embodiment 7

The RLM measurement is performed based on a reference signal received power RSRP or path loss pathloss between a first terminal and a second terminal.

Specifically, a receive end UE performs a measurement on an RS of a transmit end UE and obtains an RSRP, or a receive end UE receives an RSRP transmitted by a transmit end to it, and calculates a pathloss between the UEs based on the RSRP.

Then, the UE determines link quality based on the RSRP or pathloss, and reports a measurement result to an upper layer.

If a count that the RSRP is less than a specific threshold M−1 or that the pathloss is greater than a specific threshold N−1 reaches a configured number counter O−1 for once, or for a plurality of times totally, or for a plurality of times continuously, the link quality is considered relatively poor (for example, Qout is reported).

If a count that the RSRP is greater than a specific threshold M−2 or that the pathloss is less than a specific threshold N−2 reaches a configured number counter O−2 for once, or for a plurality of times totally, or for a plurality of times continuously, the link quality is considered good (for example, Qin is reported).

The threshold M−1 and the threshold M−2 may be the same or different, and if they are different, typically, M−2 is greater than M−1 to avoid a ping-pong effect.

The threshold N−1 and the threshold N−2 may be the same or different, and if they are different, typically, N−2 is greater than N−1 to avoid a ping-pong effect.

In addition, when the link quality turns worse or better, the UE directly reports or triggers a link failure (RLF) or recovery (recovery).

Embodiment 8

In this embodiment, the RLM measurement is performed by using a combination of one or more methods in the foregoing embodiments 1 to 7.

Embodiment 9

If the UEs are configured with a plurality of resource pools, the RLM measurement is performed in each resource pool.

Specifically, the UE may implement the foregoing solution in each resource pool to evaluate link quality.

Criteria for finally determining that the link quality is relatively poor may be as follows:
  link quality of all resource pools is relatively poor;
  link quality of some specific resource pools is relatively poor, for example:
  a resource pool for transmission of specified traffic (for example, basic security traffic);
  a resource pool for transmission to a specified destination address (for example, a specified multicast destination ID);
  a resource pool on some carriers or frequencies (for example, a specified frequency or primary carrier or bandwidth part);
  a resource pool for some types of transmission (for example, a resource pool for transmission of broadcast traffic);
  a resource pool associated with some features (for example, a resource pool associated with some QoS requirements);
  a resource pool for transmission of some special channels (for example, a resource pool for transmission of some special logical channel, or a resource pool for transmission of RRC signaling); and
  link quality of any one of the resource pools is relatively poor.

Criteria for finally determining that the link quality is recovered may be as follows:
  link quality of any one of the resource pools has become better;

link quality of some specified resource pools has become better; and link quality of all resource pools has become better.

Embodiment 10

If the UEs are configured with a plurality of beams or a plurality of antenna panels, the RLM measurement is performed on each beam or each antenna panel.

Specifically, the UE may implement the solutions in the foregoing embodiments 1 to 8 on each beam or antenna panel to evaluate link quality.

Criteria for finally determining that the link quality is relatively poor may be as follows:

link quality of all beams or antenna panels is relatively poor;

link quality of a specified beam or antenna panel is relatively poor; and link quality of any one of the beams or antenna panels is relatively poor.

Criteria for finally determining that the link quality is recovered may be as follows:

link quality of any one of the beams or of antenna panels has become better;

link quality of some specified beams or antenna panels has become better; and link quality of all beams or antenna panels has become better.

Embodiment 11

The transmit end and receive end UEs can select, enable, or disable one or more solutions in the foregoing embodiments 1 to 8 by using a variety of configuration methods, and configure various thresholds, counters, RS sequences, time-frequency resources, periods, and the like therein.

The variety of configuration methods may be negotiated or configured between the transmit end and receive end UEs by using RRC signaling, or may be configured by pre-configuration, or configured by a base station, or may be configured by an upper layer (a service layer, an application layer, or the like).

Figure 3:
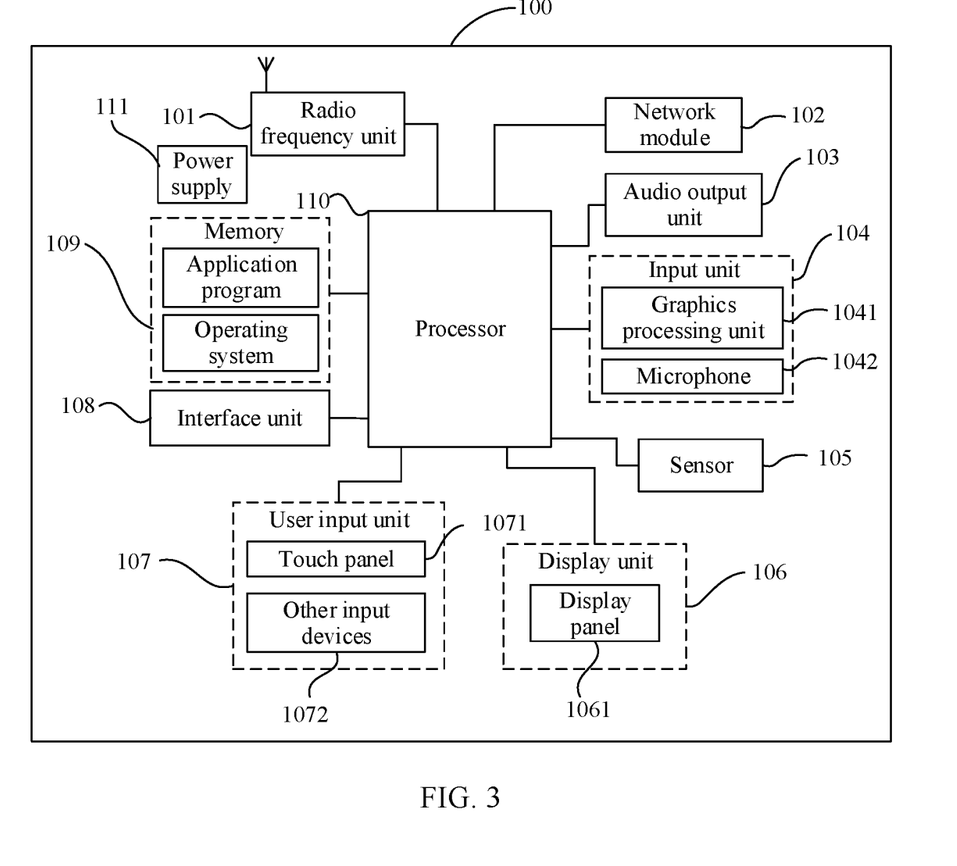
FIG. 3 is a schematic diagram of a hardware structure of a terminal for implementing the embodiments of this application.

FIG. 3 is a schematic diagram of a hardware structure of a mobile terminal implementing the embodiments of this application. The mobile terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the mobile terminal structure shown in FIG. 3 does not constitute a limitation on the mobile terminal. The mobile terminal may include more or fewer components than those shown in the figure, or some components may be combined, or there may be a different component layout. In this embodiment of this application, the mobile terminal includes but is not limited to a mobile phone, a tablet computer, a laptop computer, a palmtop computer, an in-vehicle terminal, a wearable device, a pedometer, and the like.

The mobile terminal according to this embodiment of this application can implement terminal transmit power control, and achieve purposes of coordinating interference, improving system throughput, and improving overall system performance.

It should be understood that in this embodiment of this application, the radio frequency unit 101 may be configured to transmit or receive a signal in an information transmitting/receiving or call process. Specifically, the radio frequency unit 101 receives downlink data from a base station and transmits the downlink data to the processor 110 for processing; and transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The mobile terminal provides a user with wireless broadband internet access through the network module 102, for example, helping the user to send or receive an email, to browse a web page, or to access streaming media.

The audio output unit 103 may convert audio data received by the radio frequency unit 101 or the network module 102 or stored in the memory 109 into an audio signal and output the audio signal as a sound. Furthermore, the audio output unit 103 may also provide audio output (for example, a call signal received sound or a message received sound) related to a specific function performed by the mobile terminal 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042, and the graphics processing unit 1041 processes image data of a static picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 can receive a sound and can process the sound into audio data. The processed audio data can be converted in a telephone call mode into a format that can be sent to a mobile communication base station through the radio frequency unit 101, for outputting.

The mobile terminal 100 further includes at least one sensor 105, for example, an optical sensor, a motion sensor, and other sensors. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the mobile terminal 100 moves close to an ear. As a type of motion sensor, an accelerometer sensor can detect magnitudes of accelerations in all directions (usually three axes), can detect a magnitude and a direction of gravity if the mobile phone is in a static state, and can be applied to mobile terminal posture recognition (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information and generate key signal input related to user setting and function control of the mobile terminal. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. Although in FIG. 3, the touch panel 1071 and the display panel 1061 act as two independent parts to implement input and output functions of the mobile terminal, in some embodiments, the touch panel 1071 and the display panel 1061 may be integrated to implement the input and output functions of the mobile terminal. This is not specifically limited herein.

The interface unit 108 is an interface connecting an external apparatus to the mobile terminal 100. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 108 may be configured to: receive input (for example, data information and power) from the external apparatus, and transmit the received input to one or more elements in the mobile terminal 100, or may be configured to transmit data between the mobile terminal 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, and may further include a non-volatile memory such as a disk storage device, a flash memory device, or another volatile solid-state storage device.

The processor 110 is a control center of the mobile terminal, and is connected to all components of the mobile terminal by using various interfaces and lines. By running or executing a software program and/or module that is stored in the memory 109 and calling data stored in the memory 109, the processor 110 executes various functions of the mobile terminal and processes data, so as to perform overall monitoring on the mobile terminal. The processor 110 may include one or more processing units. Preferably, an application processor and a modem processor may be integrated in the processor 110. The application processor primarily processes an operating system, user interfaces, application programs, and the like. The modem processor primarily processes radio communication. It can be understood that the modem processor may alternatively be not integrated in the processor 110.

The mobile terminal 100 may further include the power supply 111 (for example, a battery) supplying power to all components. Preferably, the power supply 111 may be logically connected to the processor 110 through a power management system. In this way, functions such as charge management, discharge management, and power consumption management are implemented by using the power management system.

In addition, the mobile terminal 100 includes some functional modules that are not shown, details of which are not described herein.

The terminal device provided in this embodiment of this application can implement the processes implemented by the mobile terminal in the foregoing method embodiment. To avoid repetition, details are not described herein again.

Preferably, an embodiment of this application further provides a mobile terminal, including: a processor 110, a memory 109, and a computer program stored in the memory 109 and capable of running on the processor 110, where when the computer program is executed by the processor 110, the processes in the foregoing embodiments of the method for radio link monitoring are implemented, with the same technical effects achieved. To avoid repetition, details are not described herein again.

An embodiment of this application further provides a computer-readable storage medium, where the computer-readable storage medium stores a computer program, and when the computer program is executed by a processor, the processes of the foregoing embodiments of the method for radio link monitoring are implemented, with the same technical effects achieved. To avoid repetition, details are not described herein again. The computer-readable storage medium is a read-only memory (ROM for short), a random access memory (RAM for short), a magnetic disk, an optical disc, or the like.

In this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for radio link monitoring, applied to a first terminal, wherein the method comprises:
    in sidelink communication, performing a radio link monitoring (RLM) measurement on a radio link between terminals to monitor radio link quality between the terminals;
    wherein the performing the RLM measurement on the radio link between the terminals to monitor the radio link quality between the terminals comprises:
    performing the RLM measurement according to a hybrid automatic repeat request (HARQ) feedback from a second terminal;
    reporting a radio link failure (RLF) to upper layer when a quantity of discontinuous transmissions (DTX) reaches a configured number L.

2. The method according to claim 1, further comprising: performing the RLM measurement on a basis of an RS of the second terminal.

3. The method according to claim 2, wherein the second terminal transmits an RS on a predetermined time-frequency resource, wherein
    the predetermined time-frequency resource is a semi-persistent resource or periodic resource that is reserved for a terminal; or,
    the predetermined time-frequency resource is an aperiodic resource or semi-persistent resource that is reserved for a terminal; or,
    the predetermined time-frequency resource is a resource associated with a sidelink synchronization block; or,
    the predetermined time-frequency resource is a resource associated or multiplexed with a specified channel.

4. The method according to claim 2, wherein a sequence of the RS of the second terminal is generated based on identification information of the second terminal.

5. The method according to claim 2, wherein
    resources reserved for terminals are time domain resources different from one another; or,
    time domain resources of the terminals are time division multiplexed.

6. The method according to claim 2, wherein the method further comprises:
    reporting a first reporting indication in a case that a count that an RLM measurement result is greater than a third threshold reaches a third preset count; or,
    reporting a second reporting indication in a case that a count that an RLM measurement result is less than a fourth threshold reaches a fourth preset count.

7. The method according to claim 1, wherein the RLM measurement is performed based on a quantity of HARQ feedbacks transmitted by the second terminal.

8. The method according to claim 7, wherein the method further comprises:
    reporting a second reporting indication in a case that a count that the quantity of DTXs reaches a sixth preset count.

9. The method according to claim 2, wherein the method further comprises:
    reporting the RLM measurement result to an upper layer, wherein the RLM measurement result comprises:
    a first reporting indication for indicating a good radio link quality; and/or,
    a second reporting indication for indicating a poor radio link quality.

10. The method according to claim 2, wherein the method further comprises:
    reporting a link failure message to an upper layer or triggering a link failure in a case that link quality becomes poor; or,
    reporting a link recovery message to an upper layer or triggering a link recovery if link quality becomes better.

11. A terminal, wherein the terminal comprises a processor, a memory, and a computer program stored in the memory, and when the computer program is executed by the processor, following steps are implemented:
    in sidelink communication, performing a radio link monitoring (RLM) measurement on a radio link between terminals to monitor radio link quality between the terminals;
    wherein the performing the RLM measurement on the radio link between the terminals to monitor the radio link quality between the terminals comprises:
    performing the RLM measurement according to a hybrid automatic repeat request (HARQ) feedback from a second terminal;
    reporting a radio link failure (RLF) to an upper layer when a quantity of discontinuous transmissions (DTX) reaches a configured number L.

12. The terminal according to claim 11, wherein when the computer program is executed by the processor, a following step is further implemented:
    performing the RLM measurement on a basis of an RS of the second terminal.

13. The terminal according to claim 12, wherein a sequence of the RS of the second terminal is generated based on identification information of the second terminal.

14. The terminal according to claim 12, wherein
    resources reserved for terminals are time domain resources different from one another; or,
    time domain resources of the terminals are time division multiplexed.

15. The terminal according to claim 12, wherein when the computer program is executed by the processor, a following step is further implemented:
    reporting a first reporting indication in a case that a count that an RLM measurement result is greater than a third threshold reaches a third preset count; or,
    reporting a second reporting indication in a case that a count that an RLM measurement result is less than a fourth threshold reaches a fourth preset count.

16. The terminal according to claim 11, wherein the RLM measurement is performed based on a quantity of HARQ feedbacks transmitted by the second terminal.

17. The terminal according to claim 16, wherein when the computer program is executed by the processor, a following step is further implemented:
    reporting a second reporting indication in a case that a count that the quantity of DTXs reaches a sixth preset count.

18. The terminal according to claim 11, wherein when the computer program is executed by the processor, a following step is further implemented:
    reporting the RLM measurement result to an upper layer, wherein the RLM measurement result comprises:
    a first reporting indication for indicating a good radio link quality; and/or,
    a second reporting indication for indicating a poor radio link quality.

19. The terminal according to claim 11, wherein when the computer program is executed by the processor, a following step is further implemented:
    reporting a link failure message to an upper layer or triggering a link failure in a case that link quality becomes poor; or,
    reporting a link recovery message to an upper layer or triggering a link recovery if link quality becomes better.

20. A non-transitory computer-readable storage medium, wherein the computer-readable storage medium stores a computer program, and when the computer program is executed by a processor, following steps are implemented:
    in sidelink communication, performing a radio link monitoring (RLM) measurement on a radio link between terminals to monitor radio link quality between the terminals;
    wherein the performing the RLM measurement on the radio link between the terminals to monitor the radio link quality between the terminals comprises:
    performing the RLM measurement according to a hybrid automatic repeat request (HARQ) feedback from a second terminal;
    reporting a radio link failure (RLF) to an upper layer when a quantity of discontinuous transmissions (DTX) reaches a configured number L.

* * * * *